US008548343B2

(12) United States Patent
Isoda et al.

(10) Patent No.: US 8,548,343 B2
(45) Date of Patent: Oct. 1, 2013

(54) IMAGE FORMING APPARATUS AND METHOD OF MEASURING LINEAR SPEED

(75) Inventors: Keisuke Isoda, Osaka (JP); Tadashi Ohba, Osaka (JP); Masaru Watanabe, Osaka (JP); Atsushi Ishizaki, Osaka (JP); Hiroki Tanaka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 272 days.

(21) Appl. No.: 13/029,792

(22) Filed: Feb. 17, 2011

(65) Prior Publication Data

US 2011/0206398 A1 Aug. 25, 2011

(30) Foreign Application Priority Data

Feb. 25, 2010 (JP) .................................. 2010-39893

(51) Int. Cl.
*G03G 15/00* (2006.01)
*G01B 11/14* (2006.01)
*G03G 15/01* (2006.01)

(52) U.S. Cl.
USPC .............................. 399/49; 356/620; 399/301

(58) Field of Classification Search
USPC ................................... 399/49, 301; 356/620
See application file for complete search history.

(56) References Cited

U.S. PATENT DOCUMENTS

| | | | | |
|---|---|---|---|---|
| 7,657,214 | B2 * | 2/2010 | Inui et al. | 399/299 |
| 8,086,156 | B2 * | 12/2011 | Tao et al. | 399/302 |
| 8,260,164 | B2 * | 9/2012 | Masuda | 399/49 |
| 2009/0238590 | A1 | 9/2009 | Masuda | |

FOREIGN PATENT DOCUMENTS

| | | |
|---|---|---|
| JP | 09-267946 | 10/1997 |
| JP | 11-024498 | 1/1999 |
| JP | 2000-132047 | 5/2000 |
| JP | 2009210786 | 9/2009 |
| JP | 2009-258601 | 11/2009 |

* cited by examiner

*Primary Examiner* — David Gray
*Assistant Examiner* — Michael Harrison
(74) *Attorney, Agent, or Firm* — K&L Gates LLP

(57) ABSTRACT

An image forming apparatus including an image carrying member, a detecting section, and a linear-speed deriving section. The image carrying member carries a toner image. The detecting section detects passages of a mark, provided on the image carrying member, at a plurality of predetermined detection positions. The linear-speed deriving section determines a linear speed of the image carrying member from times at which the detecting section detects the passage of the mark.

8 Claims, 11 Drawing Sheets

9 4 7 5 5 6 1a 1b 1c 1d 8 3a 3b 3c 3d 2 2 2 2

IMAGE FORMING APPARATUS AND METHOD OF MEASURING LINEAR SPEED

INCORPORATION BY REFERENCE

This application is based upon and claims the benefit of priority from the corresponding Japanese Patent application No. 2010-39893, filed Feb. 25, 2010, the entire contents of which is incorporated herein by reference.

BACKGROUND

The present invention relates to image forming apparatuses and methods of measuring linear speed.

In an electrophotography process type image forming apparatus, the following operations are performed. An electrostatic latent image is formed on a surface of a photosensitive member using an exposure device. Then, using a developing device, toner is adhered to the electrostatic latent image, so that toner development can be performed. The toner image that is formed is then transferred to an intermediate transfer belt. From the intermediate transfer belt, the toner image is then transferred to a sheet, and is fixed to the sheet.

In such an image forming apparatus, in order to precisely transfer the toner image to the intermediate transfer belt and the sheet, the linear speed of the intermediate transfer belt is measured, and is used in various control operations.

Examples of methods of measuring the linear speed of the intermediate transfer belt are: (a) fixing a plurality of marks in an area of the intermediate transfer belt to which a toner image is not transferred (the marks having reflectivities that differ from the surfaces of other areas of the intermediate transfer belt), using a sensor to optically detect the passage of these marks at a predetermined detection position, and calculating the linear speed of the intermediate belt using the difference between the time at which the marks pass the detection position and the intervals between the marks on the intermediate transfer belt (first method); (b) fixing a plurality of holes in an area of the intermediate transfer belt to which a toner image is not transferred, using a sensor to optically detect passages of these holes at a predetermined detection position, and calculating the linear speed of the intermediate transfer belt using the difference between the time at which the holes (marks) pass the detection position and the intervals between the holes in the intermediate transfer belt (second method); and (c) setting an encoder at a driven roller upon which the intermediate transfer belt is placed, using the encoder to measure the rotational speed of the driven roller, and calculating the linear speed of the intermediate transfer belt using the rotational speed of the driven roller (third method).

In another technique, in certain image forming apparatus, a sensor for detecting toner density includes a plurality of light-emitting elements and a plurality of photodetectors. The light-emitting elements and the photodetectors are disposed perpendicularly to a direction of movement of the intermediate transfer belt The position of a toner mark in a direction that is perpendicular to the movement direction of the intermediate transfer belt is detected using the outputs of these photodetectors.

However, in the first and second methods, the intervals between the marks and holes, formed in the intermediate transfer belt, can change due to environmental conditions and over time. As a result, the linear speed of the intermediate transfer belt may not be exactly measured. In the third method, slippage between the driven roller and the intermediate transfer belt can occur and change due to environmental conditions and over time. As a result, the linear speed of the intermediate transfer belt may not be exactly measured.

SUMMARY

According to an embodiment of the disclosure, there is provided an image forming apparatus including an image carrying member, a detecting section, and a linear-speed deriving section. The image carrying member carries a toner image. The detecting section detects passages of a mark, provided at the image carrying member, at a plurality of predetermined detection positions. The linear-speed deriving section determines the linear speed of the image carrying member from the times at which the detecting section detects passage of the mark.

According to another embodiment of the disclosure, there is provided a method of measuring linear speed. The method includes detecting passage of a mark, provided at an image carrying member, and determining the linear speed of the image carrying member. Detecting the passage of the mark includes detecting the passage of the mark at a plurality of predetermined detection positions. The linear speed of the image carrying member is determined by deriving the linear speed of the image carrying member from the times at which passage of the mark is detected.

Additional features and advantages are described herein, and will be apparent from the following Detailed Description and the figures.

BRIEF DESCRIPTION OF THE FIGURES

The following detailed description, given by way of example, but not intended to limit the disclosure solely to the specific embodiments described, may best be understood in conjunction with the accompanying drawings, in which.

DETAILED DESCRIPTION

Reference will now be made to various embodiments of the disclosure, one or more examples of which are illustrated in the accompanying drawings. Each example is provided by way of explanation, and not meant to limit the present disclosure. In fact, it will be apparent to those skilled in the art that various modifications, combinations, additions, deletions and variations can be made in the present disclosure without departing from the scope or spirit of the present disclosure. For instance, features illustrated or described as part of one embodiment can be used in another embodiment to provide a still further embodiment. It is intended that the present disclosure covers such modifications, combinations, additions, deletions, applications and variations that come within the scope of the appended claims and their equivalents. Embodiments of image forming apparatus and method of measuring linear speed will now be described.

An embodiment of the disclosure will now be described with reference to the drawings.

Figure 1:
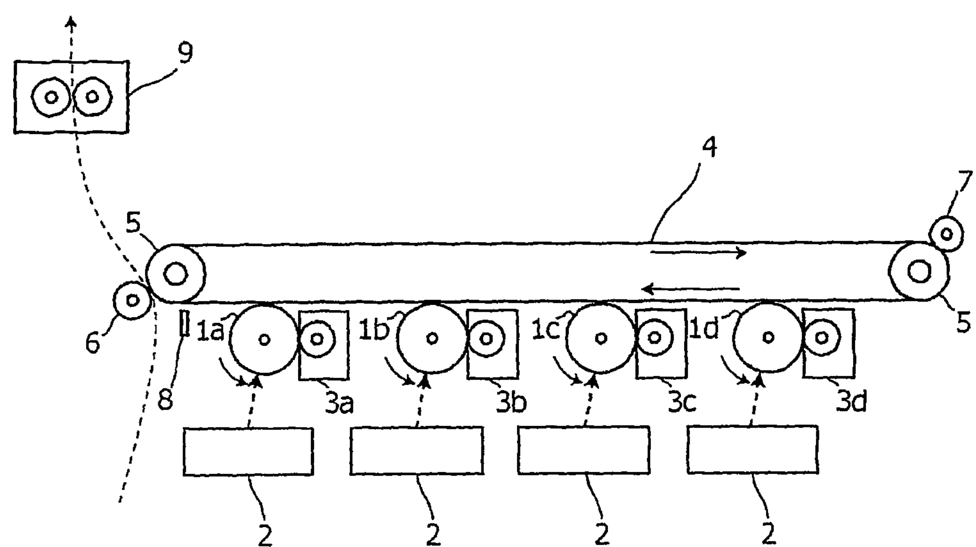
FIG. 1 is a side view of the internal structure of an image forming apparatus according to an embodiment of the disclosure.

FIG. 1 is a side view of the internal structure of an image forming apparatus according to an embodiment of the present disclosure. The image forming apparatus is an apparatus having a printing function, such as a printer, a copying machine, a facsimile, or a multifunction apparatus.

The image forming apparatus of this embodiment includes a tandem color developing device. The color developing device includes photosensitive drums 1*a* to 1*d*, exposure devices 2, and developing units 3*a* to 3*d*. The photosensitive drums 1*a* to 1*d* are photosensitive members for four colors: cyan; magenta; yellow; and black.

The exposure devices 2 illuminate the respective photosensitive drums 1*a* to 1*d* with laser light, forming electrostatic latent images. Each exposure device 2 is a laser scanner unit. For each laser scanner unit, a device such as that disclosed in, for example, Japanese Unexamined Patent Application Publication No. 2008-51841 is used. The exposure devices 2 include optical elements (such as lenses, mirrors, polygon mirrors) that guide the laser light to the respective photosensitive drums 1*a* to 1*d*. One exposure device 2 is provided for one color. Each exposure device 2 is mounted to a structural member, such as a housing located in the interior of the apparatus. When there is, for example, a variation in temperature, the optical elements in the respective exposure devices 2 are mechanically displaced, thereby shifting the optical system, and causing a positional displacement between toner patch images of the respective colors. Therefore, even if, at a certain temperature, registration is performed, color misregistration occurs. Therefore, it is necessary to perform registration correction.

The developing units 3*a* to 3*d* cause toner in the toner cartridges to be adhered to the electrostatic latent images on the photosensitive drums 1*a* to 1*d*, and to form toner images.

The photosensitive drum 1*d* and the developing unit 3*d* perform magenta development. The photosensitive drum 1*c* and the developing unit 3*c* perform cyan development. The photosensitive drum 1*b* and the developing unit 3*b* perform yellow development. The photosensitive drum 1*a* and the developing unit 3*a* perform black development.

When performing registration (including registration correction), the developing units 3*a* to 3*d* develop color toner patch images.

The intermediate transfer belt 4 is an intermediate transfer member and an annular image carrier that contacts the photosensitive drums 1*a* to 1*d* and causes the toner images on the photosensitive drums 1*a* to 1*d* to be transferred thereto. The intermediate transfer belt 4 is tightly stretched on driving rollers 5. Due to the driving force of the driving rollers 5, the intermediate transfer belt 4 is rotated in a direction from a position where it contacts the photosensitive drum 1*d* to a position where it contacts the photosensitive drum 1*a*. The intermediate transfer belt 4 carries the toner patch images when registration is performed.

A transfer roller 6 causes a sheet that is fed to contact the intermediate transfer belt 4, and the toner images on the intermediate transfer belt 4 to be transferred to the sheet. The sheet, having the toner images transferred thereto, is fed to a fixing device 9 to fix the toner images onto the sheet.

A roller 7 contacts the intermediate transfer belt 4, and removes any toner remaining on the intermediate transfer belt 4 after transferring the toner images to the sheet.

A sensor 8 illuminates the intermediate transfer belt 4 with a light ray, and detects the reflected portion of the light ray. When performing registration, the sensor 8 illuminates the toner patch images on the intermediate transfer belt 4 with the light ray, and detects the reflected portion of the light ray, thereby detecting passage of the toner patch images.

Figure 2:
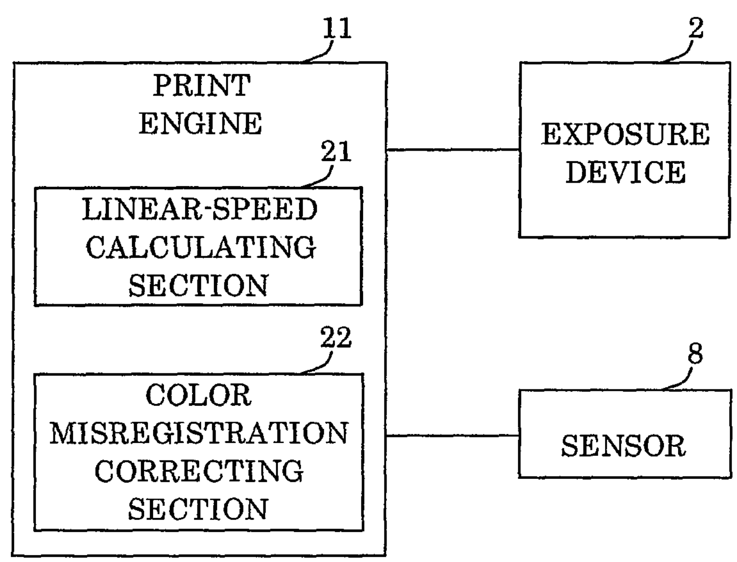
FIG. 2 is a block diagram of a functional structure of the image forming apparatus according to an embodiment of the disclosure.

FIG. 2 is a block diagram of a functional structure of the image forming apparatus according to an embodiment of the disclosure. In FIG. 2, the print engine 11 is a processing circuit that controls the exposure devices 2 and a driving source (not shown) that drives the aforementioned rollers, etc., to execute development of the toner images, a transfer operation, a fixing operation, a sheet-feed operation, a printing operation, and a sheet-discharge operation.

The print engine 11 includes a linear-speed calculating section 21 and a color misregistration correcting section 22.

The linear-speed calculating section 21 is a processing section that identifies the time at which one linear-speed measurement mark (here, a toner patch image for when the registration (including registration correction) is performed) passes a plurality of detection positions are detected, and calculates the linear speed of the intermediate transfer belt 4 from the times at which the plurality of detection positions are passed.

In the registration (including registration correction), the color misregistration correcting section 22 samples an output signal of the sensor 8 for every predetermined sampling period, and monitors it. Based on the time at which the toner patch image of each color is detected by the sensor 8, the color misregistration correcting section 22 calculates a correction factor that eliminates a current color misregistration. In accordance with the correction factor, the color misregistration correcting section 22 controls each portion so that color misregistration does not occur.

Figure 3:
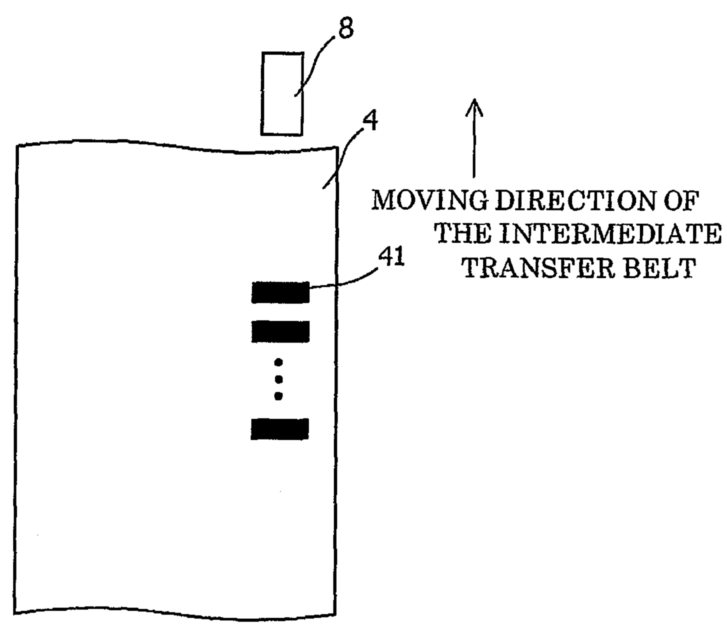
FIG. 3 illustrates an example of a mark that is formed on an intermediate transfer belt in the image forming apparatus of FIG. 1.

FIG. 3 illustrates an example of a mark that is formed on the intermediate transfer belt 4 in the image forming apparatus of FIG. 1.

As illustrated in FIG. 3, in the embodiment, one of the plurality of toner patch images for the registration (including registration correction), formed on the intermediate transfer belt 4, is used as a linear-speed measurement mark 41. In the widthwise direction of the intermediate transfer belt 4, the mark 41 is formed at a location where it passes the plurality of detection positions detected by the sensor 8. In the embodiment, the leading toner patch image (in the direction of movement of the intermediate transfer belt 4) among the plurality of toner images is used as the mark 41.

Here, the sensor 8 will be described in more detail.

The sensor 8 is positioned so that it opposes the intermediate transfer belt 4. At a plurality of predetermined detection positions, the passage of the mark 41, on the intermediate transfer belt 4, is detected at the predetermined detection positions. The sensor 8 causes a measurement light to be focused on the plurality of detection positions, and detects portions of the measurement light reflected by the respective detection positions. The sensor 8 outputs an output signal corresponding to the detected reflected portions of the measurement light or detected transmitted portions of the measurement light. The output signals are supplied to the print engine 11 through, for example, an amplifier circuit or a filter circuit if necessary. The output signals are sampled and handled as digital data. The linear-speed calculating section 21 specifies the time at which the mark 41 passes the plurality of detection position using the output signals.

Figure 4:
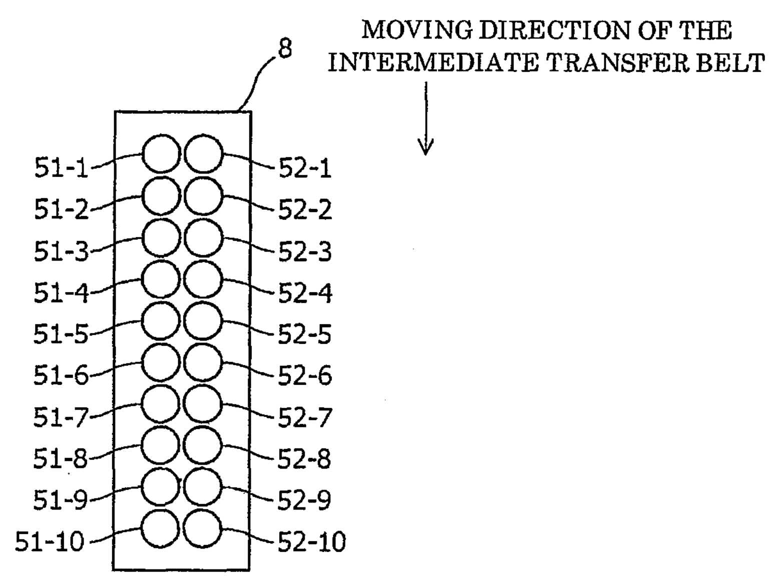
FIG. 4 is a front view of the structure of the sensor of FIGS. 1 and 2.
Figure 5A:
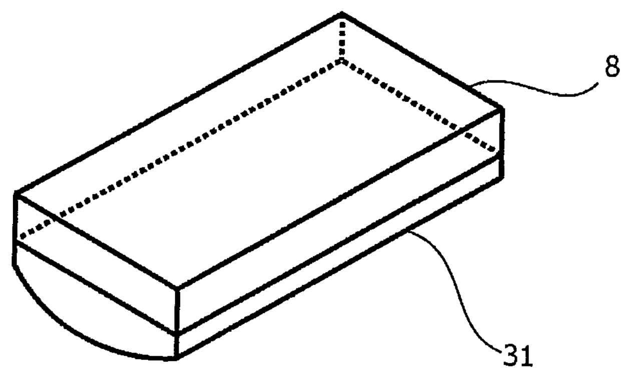
FIG. 5A is a perspective view of the sensor of FIG. 4 to which an optical lens is mounted.
Figure 5B:
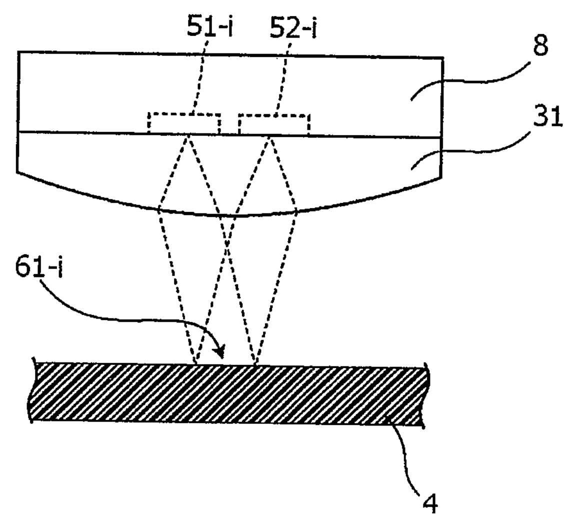
FIG. 5B is a side view of the sensor of FIG. 4 to which the optical lens is mounted.
Figure 6:
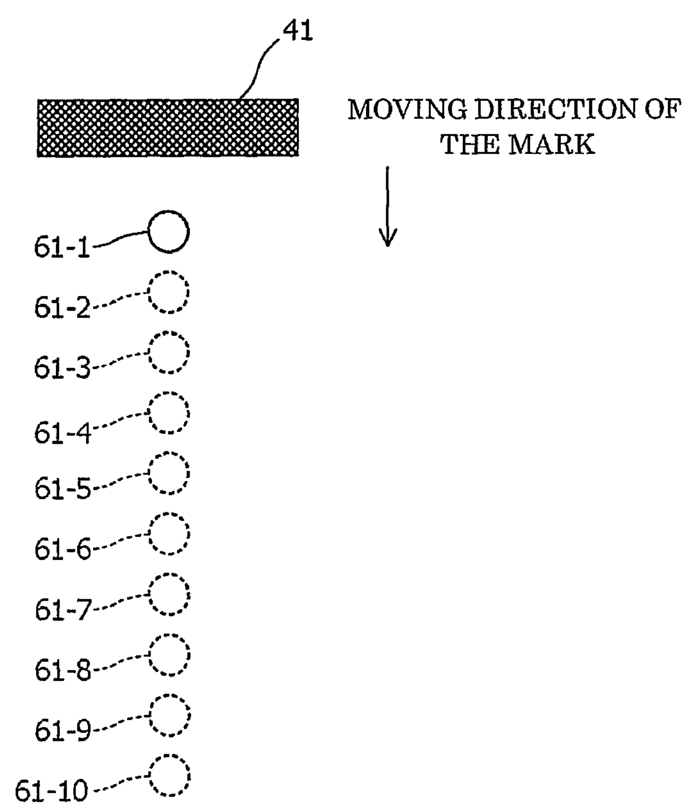
FIG. 6 illustrates exemplary detection positions where the mark is detected in the image forming apparatus of FIGS. 1 and 2.

FIG. 4 is a front view of the structure of the sensor 8 of FIGS. 1 and 2. FIGS. 5A and 5B are, respectively, a perspective view and a side view of the sensor 8 of FIG. 4 to which an optical lens 31 is mounted. FIG. 6 illustrates exemplary detection positions where the mark 41 is detected in the image forming apparatus of FIGS. 1 and 2.

As illustrated in FIG. 4, the sensor 8 includes a plurality of light-emitting elements 51-1 to 51-10 and a plurality of photodetectors 52-1 to 52-10. In the embodiment, a light-emitting element 51-*i* and a photodetector 52-*i* (i=1, . . . , 10) form a pair. The measurement light that is emitted from the light-emitting element 51-*i* is reflected by the intermediate transfer belt 4, and the reflected portion of the measurement light is incident upon the photodetector 52-*i*.

The light-emitting element 51-*i* (i=1, . . . , 10) focuses the measurement light towards a detection position 61-*i*. The light-emitting elements 51-1 to 51-10 have the same characteristics. As the light-emitting element 51-*i*, for example, a light-emitting diode is used. The photodetector 52-*i* (i=1, . . . , 10) receives the reflected portion of the measurement light from the detection position 61-*i*, and outputs an electrical signal based on the intensity of the received light. The photodetectors 52-1 to 52-10 have the same characteristics. As the photodetector 52-*i*, for example, a photodiode is used.

The light-emitting elements 51-1 to 51-10 and the photodetectors 52-1 to 52-10 are positioned in the direction of movement of the intermediate transfer belt 4. In particular, in the embodiment, the light-emitting elements 51-1 to 51-10 and the photodetectors 52-1 to 52-10 are positioned so as to be parallel with the movement direction of the intermediate transfer belt 4.

In the sensor 8 illustrated in FIG. 4, the positions of the light-emitting elements 51-1 to 51-10 when viewed in a direction perpendicular to the movement direction of the intermediate transfer belt 4 are constant. However, as long as the light-emitting elements 51-1 to 51-10 are located in the movement direction of the intermediate transfer belt 4, the positions of the light-emitting elements 51-1 to 51-10 in a direction perpendicular to the movement direction need not be constant. This also applies to the photodetectors 52-1 to 52-10.

As illustrated in FIGS. 5A and 5B, the optical lens 31 is located between the light-emitting elements 51-1 to 51-10 of the sensor 8 and the intermediate transfer belt 4 and between the photodetectors 52-1 to 52-10 and the transfer intermediate belt 4. In the embodiment, the optical lens 31 is a plano-convex cylindrical lens. The optical lens 31 causes the measurement light from the light-emitting element 51-*i* to be formed into parallel light, and to be incident upon the detection position 61-*i* that corresponds to the light-emitting element 51-*i*. Then, the optical lens 31 causes the portion of the parallel light reflected from the detection position to converge at, and to be incident upon, the photodetector 52-*i* that forms a pair with the light-emitting element 51-*i*.

Due to this structure, as illustrated in FIG. 6, the measurement light from the light-emitting element 51-*i* forms a spot on the detection position 61-*i* on the intermediate transfer belt 4. That is, as illustrated in FIG. 6, the sensor 8 illustrated in FIG. 4 and FIGS. 5A and 5B detects the passage of mark 41 at 10 detection locations (61-1 to 61-10).

Next, the operation of the image forming apparatus when the linear speed of the intermediate transfer belt 4 is measured will be described.

In measuring the linear speed of the intermediate transfer belt 4, the print engine 11 or an analog driving circuit (not shown) controls the light-emission periods of the light-emitting elements 51-1 to 51-10. In this embodiment, since a toner patch image for performing registration is used for the mark 41, the print engine 11 causes the toner patch image to be developed on the photosensitive drums 1*a* to 1*d* and transferred to the intermediate transfer belt 4.

Figure 7:
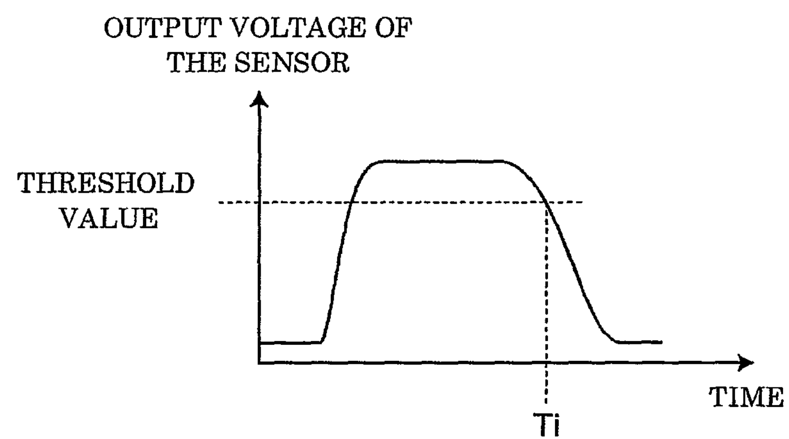
FIG. 7 illustrates an exemplary waveform of an output signal of a photodetector of the sensor of FIG. 4.
Figure 8:
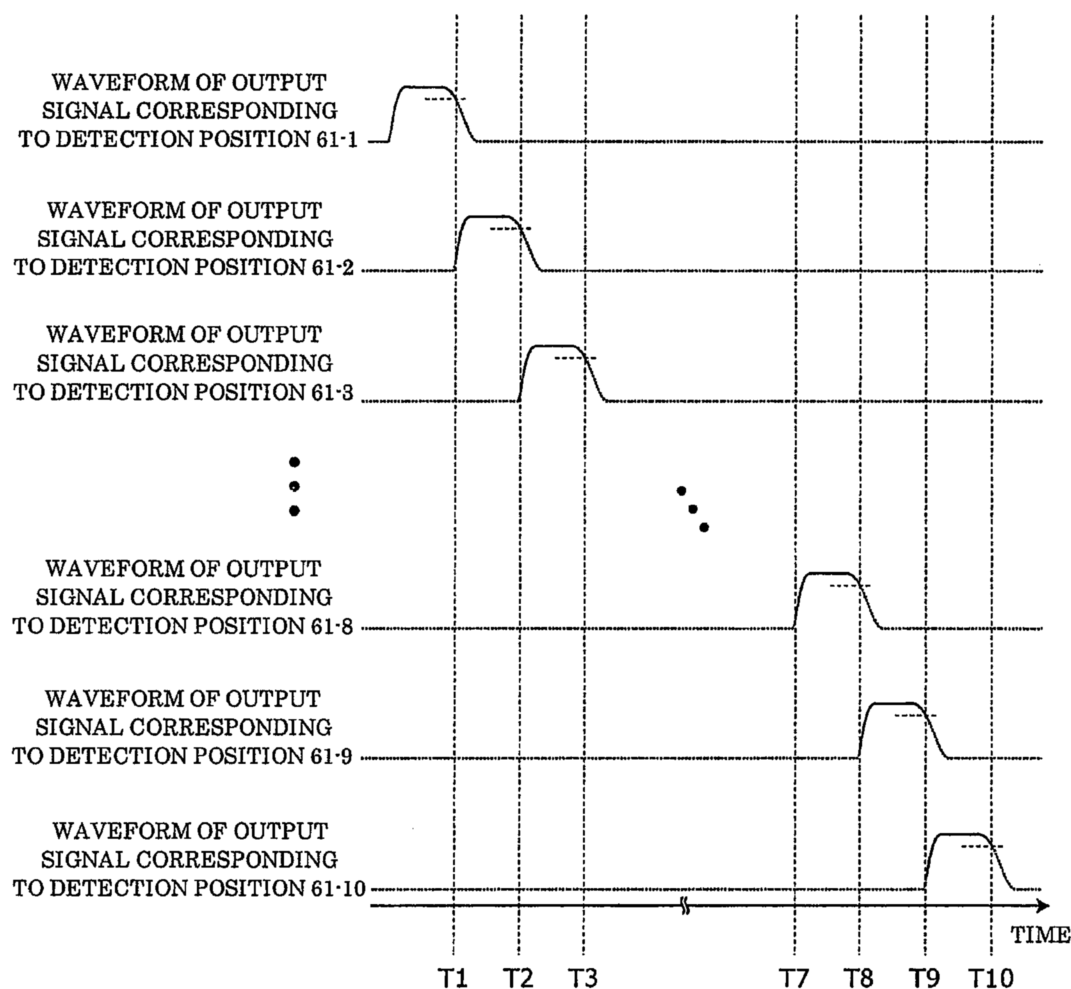
FIG. 8 illustrates exemplary waveforms of output signals of a plurality of the photodetectors of the sensor of FIG. 4.

FIG. 7 illustrates an exemplary waveform of an output signal of the photodetector 52-*i* of the sensor 8 of FIG. 4. When the mark 41 passes the detection position 61-*i*, the reflectivity of the surface of the intermediate transfer belt 4 at the detection position 61-*i* is increased for diffused light (senkrecht wave). Therefore, as illustrated in FIG. 7, the voltage of the output signal is increased. The sensor 8 is not limited to one that detects senkrecht wave and the sensor 8 may be one that detects parallel wave. FIG. 8 illustrates exemplary waveforms of output signals of the plurality of the photodetectors 52-*i* of the sensor 8 of FIG. 4.

As illustrated by the solid lines in FIG. 8, when the measurement of the linear speed is started, first, the print engine 11 or the analog driving circuit (not shown) turns on the light-emitting element 51-1 and monitors an output voltage of the photodetector 52-1. After the output voltage exceeds a predetermined threshold value, the print engine 11 or the analog driving circuit (not shown) detects the time T1 when the output voltage becomes less than its threshold value. The print engine 11 or the analog driving circuit turns off the light-emitting element 51-1 at time T1, stops an output of an output signal from the photodetector 52-1, turns on the light-emitting element 51-2, and causes the photodetector 52-2 to start outputting an output signal. At this time, the linear-speed calculating section 21 of the print engine 11 obtains and stores the time T1. When the analog driving circuit controls the light-emitting element 51-*i* and the photodetector 52-*i*, the analog driving circuit supplies a signal indicating the time T1 to the print engine 11.

Then, the print engine 11 or the analog driving circuit (not shown) monitors the output voltage of the photodetector 52-2. After the output voltage exceeds its predetermined threshold value, the print engine 11 or the analog driving circuit (not shown) detects the time T2 when the output voltage becomes less than its threshold value, and turns off the light-emitting element 51-2 at time T2. At this time, the print engine 11 or the analog driving circuit (not shown) stops the output of the output signal from the photodetector 52-2, turns on the light-emitting element 51-3, and causes the photodetector 52-3 to start outputting an output signal. Additionally, the linear-speed calculating section 21 of the print engine 11 obtains and stores the time T2.

Subsequently, similarly, as the mark 41 moves, the light-emitting element 51-*j* (j=3, . . . , 9) are turned off, the light-emitting element 51-(*j*+1) turned on, the output from the photodetector 52-*j* is stopped and the output from the photodetector 52-(*j*+1) is started, and the time Tj is obtained, all performed in that order. After the output voltage of the photodetector 52-10 exceeds its predetermined threshold value after turning on the light-emitting element 51-10, the print engine 11 or the analog driving circuit (not shown) detects the time T10 when the output voltage becomes less than its threshold value, turns off the light-emitting element 51-10 at time T10, and stops an output of an output signal from the photodetector 52-10. At this time, the linear-speed calculating section 21 of the print engine 11 obtains and stores the time T10.

Then, the linear-speed calculating section 21 uses at least two of the obtained times T1 to T10, to determine the linear speed of the intermediate transfer belt 4.

For example, when time Tk and time T(k+1) for two adjacent detection positions 61-*k* and 61-(*k*+1) are used, the linear-speed calculating section 21 calculates a linear speed VL using the following equation:

$$VL=Lk/(T(k+1)-Tk)$$

Lk represents the distance between the center of the detection position 61-*k* and the center of the detection position 61-(*k*+1). If the light-emitting elements (51-1 to 51-10) are located at equal intervals and the photodetectors (52-1 to 52-10) are located at equal intervals and the interval between two adjacent light-emitting elements, among the light-emitting elements 51-1 to 51-10, and the interval between two adjacent photodetectors, among the photodetectors 52-1 to 52-10, are the same, the intervals between the detection positions 61-1 to 61-10 are the same. Therefore, the interval between two adjacent detection positions, among the detection positions 61-1 to 61-10, is also the same as the intervals between the light-emitting elements and the intervals between the photodetectors. In this situation, if, for example, the intervals between the light-emitting elements and the intervals between the photodetectors are 400 micrometers, Lk is also 400 micrometers.

It is possible for the linear-speed calculating section 21 to use a time Tp and a time Tq for two detection positions 61-*p* and 61-*q* (q>p) that are not adjacent to each other. The linear speed VL is calculated using the following equation:

$$VL=Lpq/(Tq-Tp)$$

Lpq represents the distance between the center of the detection position 61-*p* and the center of the detection position 61-*q*.

The linear-speed calculating section 21 can calculate the linear speed VL for a combination of two detection positions as mentioned above, calculate the average value thereof, and set the average value as the linear speed of the intermediate transfer belt 4.

The linear speed of the intermediate transfer belt 4, that is measured as described above, is used for controlling the linear speed of the intermediate transfer belt 4 by the print engine 11 during ordinary printing or various calibrations. It can also be used as a parameter when correcting color misregistration by the color misregistration correcting section 22. In controlling the linear speed of the intermediate transfer belt 4 by the print engine 11, the print engine 11 controls the rotational speed of the driving motor that drives the driving rollers 5, with the linear speed value being a feedback amount.

As described above, according to an embodiment, the sensor 8 detects the passage of the mark 41, provided on the intermediate transfer belt 4, at the predetermined detection positions 61-1 to 61-10; and the linear-speed calculating section 21 specifies the times at which the sensor 8 detects the passages of the mark 41, and determines the linear speed of the intermediate transfer belt 4 from the times T1 to T10 at which the mark 41 passes the detection positions 61-1 to 61-10.

Accordingly, since the linear speed is determined from the times at which one mark 41 passes the detection positions 61-1 to 61-10, derivation due to environmental changes or changes over time of the intermediate transfer belt 4 seldom influence the determination, thereby making it possible to precisely measure the linear speed of the intermediate transfer belt 4.

According to an embodiment, while the light-emitting element 51-*i* corresponding to one detection position 61-*i*, among the detection positions 61-1 to 61-10, emits measurement light and the mark 41 is detected at the detection position 61-*i*, the light-emitting element or the light-emitting elements corresponding to a remaining detection position or remaining detection positions of the detection positions 61-1 to 61-10 do not emit measurement light.

Because of this, light from the light-emitting element corresponding to a different detection position that is near the detection position 61-*i* during the measurement is not incident upon the photodetector 52-*i* corresponding to the detection position 61-*i* during the measurement, thereby making it possible to precisely measure the reflected portions of the light.

According to an embodiment, the image forming apparatus further includes the color misregistration correcting section 22 that corrects color misregistration at the intermediate transfer belt 4 for the plurality of colors. The mark 41 is a toner image for registration correction. The color misregistration correcting section 22 corrects color misregistration based on the linear speed calculated by the linear-speed calculating section 21.

This makes it possible to measure the linear speed when performing registration correction.

The present invention is not limited to the above disclosed embodiments thereto. Various modifications and changes can be made without departing from the gist of the present invention.

For example, in the above-described embodiment, the method of positioning the light-emitting elements and the photodetectors of the sensor 8 is not limited to that described above. As long as the light-emitting elements corresponding to predetermined detection positions are located at locations which enable measurement light to be incident upon the detection positions, and as long as the photodetectors corresponding to the detection positions are located at locations upon which reflected portions of the measurement light are incident, they can be arranged at other predetermined positions that are specified along the movement direction of the intermediate transfer belt 4 (that is, the direction of movement of the mark 41). With two photodetectors being located at the same distance from a light emitting element, one light-emitting element may be used for two detection positions.

Figure 9A:
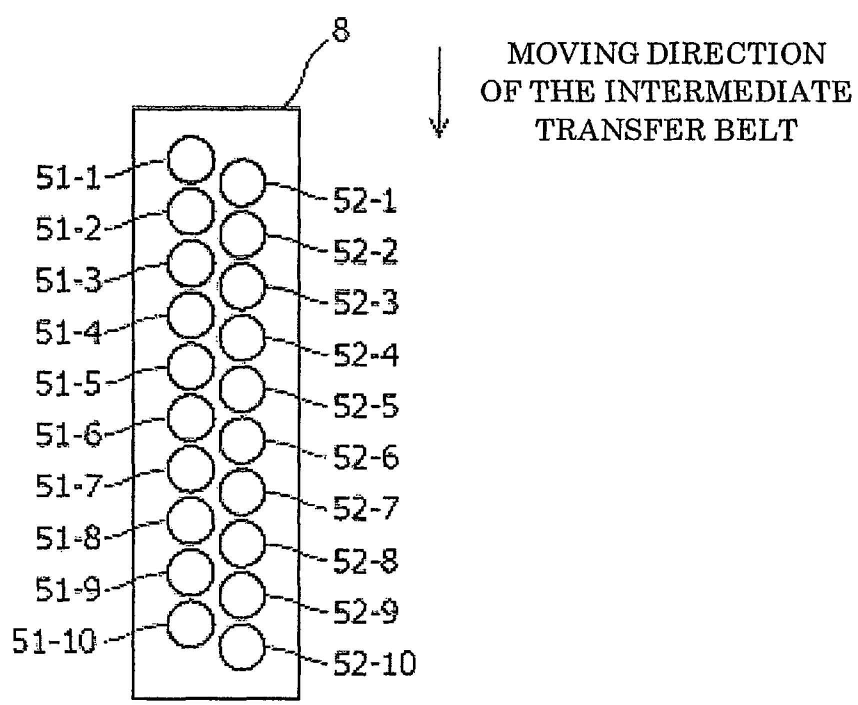
FIG. 9A illustrates an exemplary method of arranging light-emitting elements and the photodetectors of the sensor of FIG. 1.
Figure 9B:
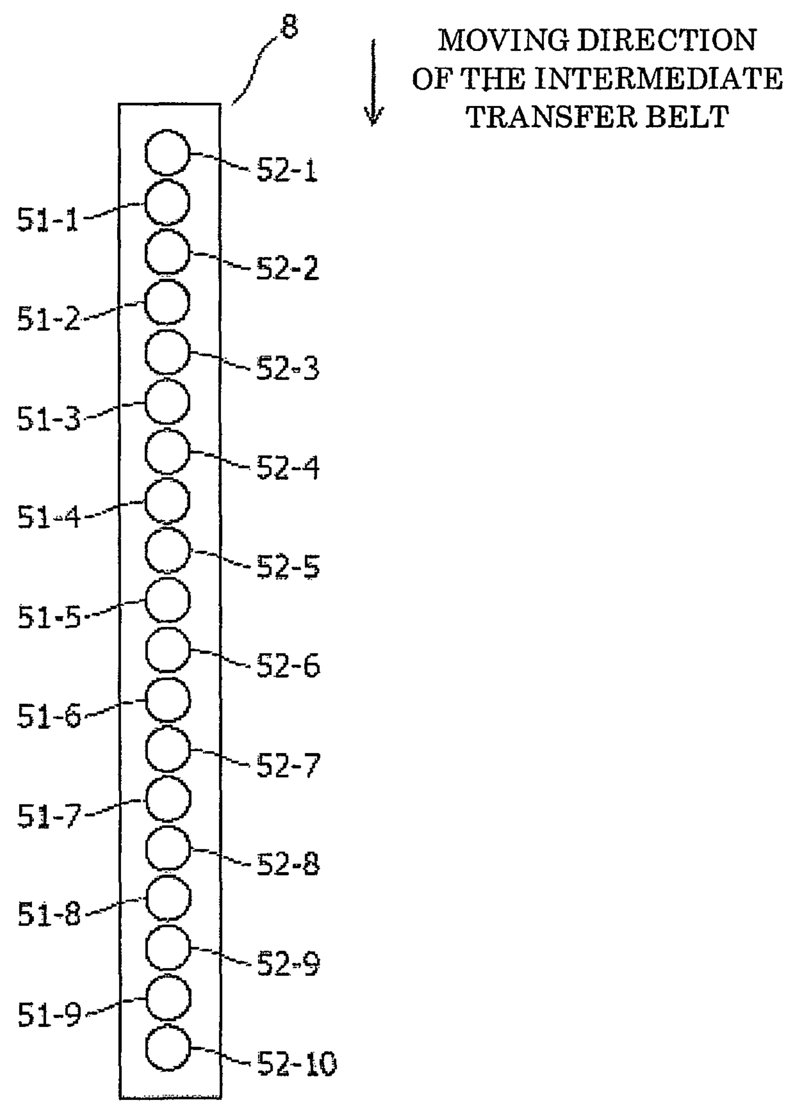
FIG. 9B illustrates another exemplary method of arranging the light-emitting elements and photodetectors of the sensor of FIG. 1.
Figure 9C:
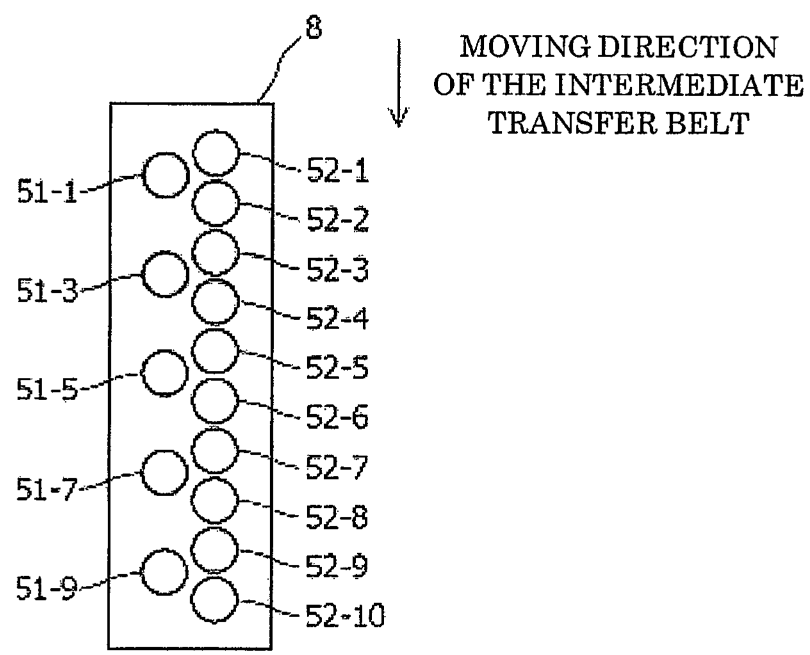
FIG. 9C illustrates another exemplary method of arranging the light-emitting elements and photodetectors of the sensor of FIG. 1.

FIGS. 9A, 9B, and 9C illustrate exemplary methods of locating the light-emitting elements and the photodetectors of the sensor 8 of FIG. 1.

In the arrangement illustrated in FIG. 4, the light-emitting elements 51-*i* and the respective photodetectors 52-*i* that form pairs are located perpendicularly to the movement direction of the intermediate transfer belt 4, whereas, in the arrangement illustrated in FIG. 9A, the light-emitting elements 51-*i* and the photodetectors 52-*i* are obliquely arranged. Even in such a situation, it is possible to form spots of measurement light at the detection positions 61-1 to 61-10 illustrated in FIG. 6.

As illustrated in FIG. 9B, the light-emitting elements 51-*i* and the photodetectors 52-*i* may be alternately located in one row. In this situation, as illustrated in FIG. 9B, the light-emitting element 51-10 may be omitted, and the light-emitting element 51-9 may be used for the photodetectors 52-9 and 52-10.

As illustrated in FIG. 9C, each of the light-emitting elements 51-*i* may be used for two photodetectors.

Although, in an embodiment, one optical lens 31 is provided for each sensor 8, one optical lens may be provided for every pair of the light-emitting element 51-*i* and the photodetector 52-*i*. Alternatively, one optical element each may be provided for the optical elements 51-*i* and the photodetectors 52-*i*.

Although, in the above-described embodiment, a toner image is used as the mark for measuring the linear speed, it is possible to previously fixedly form a mark and use it as the mark for measuring the linear speed. When the fixedly formed mark is used, the mark is formed in an area where a toner image is not transferred. For example, the fixedly formed mark may be formed on the back surface of the intermediate transfer belt 4 (that is, the surface where a toner image is not formed). When the mark is formed on the back surface, the sensor 8 is located at a position facing the back surface.

Although, in an embodiment, a toner image is used as the mark for measuring the linear speed, a hole may be used instead. In this situation, the photodetector 52-*i* of the sensor 8 is located at a position where a portion of the measurement light from the light-emitting element 51-*i* is transmitted through the hole.

Although, in the above-described embodiment, a toner image for registration is used as the mark for measuring the linear speed, a toner image for correcting toner density may be used instead.

Although, in the above-described embodiment, in the color image forming apparatus, the linear speed of the intermediate transfer belt 4 is measured, it is possible to measure the linear speed of the intermediate transfer belt 4 in a black-and-white image forming apparatus.

In the above-described embodiment, when the value of the output signal of the photodetector 52-*i* corresponding to one detection position 61-*i* becomes less than the predetermined threshold value, the light-emitting element 51-(*i*+1) corresponding to the next detection position 61-(*i*+1) is turned on. However, in the situation where the value of the output signal of the photodetector 52 is increased at least after the center of the mark 41 passes the center of the detection position 61-*i*, when the value of the output signal of the photodetector 52-*i* corresponding to the one detection position 61-*i* becomes greater than the predetermined threshold value, the light-emitting element 51-*i* is turned off, and the light-emitting element 51-(*i*+1) corresponding to the next detection position 61-(*i*+1) is turned on.

Although, in the above-described embodiment, the number of detection positions is ten, any number of detection positions may be used as long as the number of detection positions is at least two.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus comprising:

an image carrying member that carries a toner image;

a detecting section that detects passage of a mark, on the image carrying member, at a plurality of predetermined detection positions; and a linear-speed deriving section that determines a linear speed of the image carrying member from the times at which the detecting section detects the passage of the mark, wherein the detecting section causes measurement light to be incident upon the detection positions, detects reflected portions of the measurement light from the detection positions, and outputs an output signal corresponding to the detected portions of light, the linear-speed deriving section specifies the times at which the plurality of detecting sections detects the passage of the mark, based on the output signals, the detecting section includes light-emitting elements that emit the measurement light and photodetectors that receive the reflected portions of the measurement light, the light-emitting elements and the respective photodetectors forming pairs located at positions corresponding to the detection positions, and a light-emitting element corresponding to one of the detection positions emits the measurement light and the mark is detected at the one of the detection positions and a light-emitting element corresponding to a remaining detection position does not emit the measurement light.

2. The image forming apparatus according to claim 1, wherein the light-emitting elements and the photodetectors are located in a direction of movement of the image carrying member.

3. The image forming apparatus according to claim 1, wherein the linear-speed deriving section determines the linear speed from the times and from intervals between the light-emitting elements and/or intervals between the photodetectors corresponding to the detection positions.

4. The image forming apparatus according to claim 1, wherein, when a value of the output signal of the photodetector corresponding to the one of the detection positions becomes greater than or less than a predetermined threshold value, the emission of the measurement light from the light-emitting element corresponding to the one detection position is stopped, and the emission of the measurement light from the light-emitting element corresponding to the next detection position is started.

5. The image forming apparatus according to claim 1, comprising an optical lens that causes the measurement light from the light-emitting elements to be formed into parallel light and incident upon the detection positions corresponding to the light-emitting elements and causes the reflected portions of the parallel light from the detection positions to converge at and be incident upon the photodetectors forming the pairs with the respective light-emitting elements.

6. The image forming apparatus according to claim 1, wherein the mark is a mark that is fixedly formed on the image carrying member or is a toner image.

7. The image forming apparatus according to claim 1, comprising a color misregistration correcting section that corrects color misregistration at the image carrying member for a plurality of colors, the mark is a toner image for registration correction, and the color misregistration correcting section corrects color misregistration based on the linear speed that is determined by the linear-speed deriving section.

8. The image forming apparatus according to claim 1, comprising a linear-speed controlling section that controls the linear speed of the image carrying member based on the linear speed that is determined by the linear-speed deriving section.

* * * * *